United States Patent Office 2,958,906
Patented Nov. 8, 1960

2,958,906

METHOD FOR JOINTING THERMOPLASTIC SYNTHETIC RESIN PIPES, PIPE FITTINGS AND THE LIKE

Sidney Edward Youthed, Totteridge, London, England, assignor to J. S. & F. Folkard Limited, Edgware, England, a British company Filed Dec. 10, 1956, Ser. No. 627,337

Claims priority, application Great Britain Apr. 16, 1956

4 Claims. (Cl. 18—59)

This invention relates to an improved method for jointing pipes, pipe fittings and like members made of thermoplastic synthetic resin material such as polythene, polyethylene or any other synthetic resin having similar heat reaction and utilising a spigot and socket type joint. A main object of the invention is to enable such joints to be effected efficiently and expeditiously without weakening the material at the joint.

Accordingly the invention provides a method of jointing pipes, pipe fittings and like members made of thermoplastic synthetic resin material such as polythene or polyethylene and having one member end to be jointed formed as a socket and the other as a spigot, wherein the inner peripheral surface of the socket and the outer peripheral surface of the spigot are melted separately to a pre-determined depth, the peripheral socket wall being subjected to a resilient compressive force acting radially inwards, and wherein the spigot is entered into the socket whilst the said peripheral surfaces are still in the melted condition, the said compressive force on the socket wall acting to maintain the melted surfaces in pressed together relationship during cooling.

Figure 1:
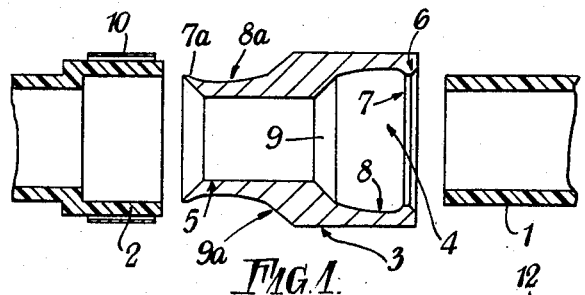
Figure 5:
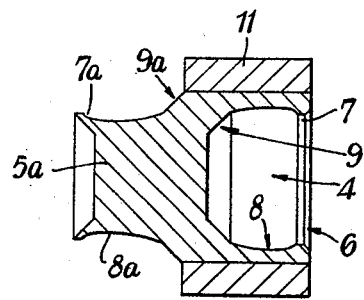
Figure 6:
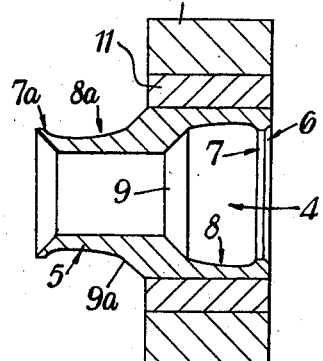
Figure 2:
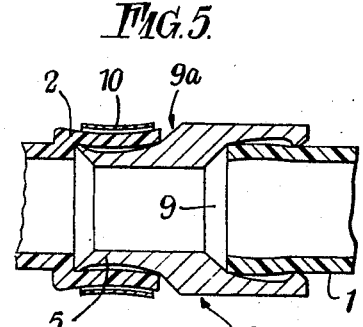
Figure 3:
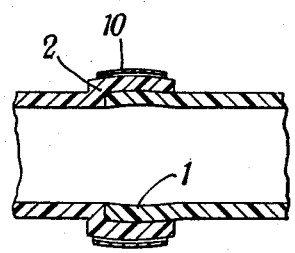
Figure 4:
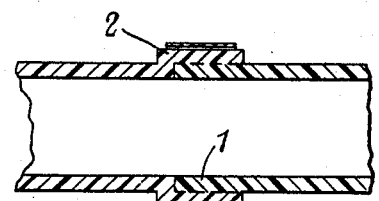

In order that the invention may be clearly understood and readily carried into effect an embodiment of the method and several embodiments of the tool will now be described in detail with reference to the accompanying drawings in which:

Figure 1 is an exploded sectional view showing an end of a pipe forming a spigot, an end of a pipe fitting formed into a socket and a basic form of heating tool, Figure 2 is a view similar to Figure 1 but shows the spigot and socket engaged with the tool and slightly bellied under applied heat, Figure 3 is a sectional view showing the spigot and socket of Figure 2 after they have been withdrawn from the tool and first mated together, the distortion which takes place being slightly exaggerated for illustrative purposes, Figure 4 is a cross-sectional view similar to Figure 3 but showing the jointed spigot and socket after cooling, Figure 5 shows one modified form of tool in cross-sectional elevation, and Figure 6 is a view similar to Figure 5 but showing a further tool modification.

Referring now to the drawings, Figures 1 to 4 show an embodiment of the invention applied to the jointing of a spigot 1, constituted by the terminal end of a polythene or polyethylene pipe, with a socket 2 which is made of similar material and is provided in known manner on the end of a pipe fitting. Alternatively, the socket could be provided on another pipe, a junction piece or any other similar member. For the purpose of heating the appropriate surfaces of the spigot 1 and socket 2 a tool 3 is provided which may be made of steel or other heat conducting material. The tool 3 has an annular cross-section and is provided at one end with a collar 4 for accommodating the spigot 1 and, at the other end, with a hollow plug 5 which fits into the socket 2.

The mouth of the tool collar 4 is chamfered at 6 to provide a lead in for the spigot 1 and, immediately behind the chamfer 6, the collar mouth is provided with an inwardly directed sizing lip 7 having a narrow cylindrical surface the diameter of which is equal to the required external diameter of the spigot 1. Behind the lip 7, the tool collar has its internal surface peripherally recessed at 8, the floor of the recess 8 being in the shape of a parabolic curve in cross-section, or in any other appropriate shape, and the internal diameter of the inner end of the recess being again equal to the internal diameter of the lip 7. Beyond the inner end of the recess 8, the collar has a frusto-conical wall part 9 which converges away from the collar mouth at an angle of some 45° to the longitudinal tool axis.

The external surface of the tool plug part 5 is shaped similarly to the internal surface of the collar 4 but in a reverse manner, there being an outwardly directed internally chamfered sizing lip 7a provided around the leading plug end followed by an external peripheral recess 8a and a frusto-conical divergent wall portion 9a. The plug lip 7a has an external diameter which equals the desired internal diameter of the socket 2 and is such that, when the spigot 1 and socket 2 are correctly sized by the respective lips they can mate together as a sliding fit.

Prior to the formation of a joint, a flexible band 10 is fitted around the outside wall surface of the socket 2 so as to exert a radially compressive force on the socket in the inward direction.

For the purpose of forming the joint, the tool 3 is heated by a blow lamp, gas torch or in any other convenient manner to a temperature of at least 350° C. and which can rise as high as 500° C. When the tool is sufficiently heated, the socket 2 is first applied to the plug part 5 of the tool and pushed home until the rim of the socket reaches the apex of the outwardly convergent plug wall portion 9a which serves as a stop and also to centralise the socket on the plug. As the socket is pushed home on to the plug it slides progressively over the plug lip 7a and this lip is sufficiently hot to melt the inner wall surface of the thermo-plastic socket. As a result of such melting, any excess material is pushed away in molten form so that the internal socket diameter becomes accurately sized. As soon as the socket has been positioned on the tool plug, the spigot 1 is introduced into the tool collar 4, the outer spigot diameter again being accurately sized by the lip 7 and the spigot being finally stopped and centred in the tool collar due to the spigot end contacting the wider end of the frusto-conical portion 9 within the tool collar.

The spigot and socket are left engaged with the tool for a pre-determined time, not exceeding a few seconds, further heat being in the meantime applied by radiation to those portions of the already melted spigot and socket surfaces which are located opposite the recesses 8 and 8a. As a result of this reflected heat, the inserted spigot 1 tends to expand naturally as it begins to soften and takes up a slightly outwardly bellied form. The reflected heat on the socket 2 also causes the socket wall to soften but, due to the action thereon of the compression band 10, the socket will tend to belly inwards slightly. An indication of the shapes taken up by the spigot and socket after heating is clearly shown in Figure 2.

As soon as the spigot and socket have absorbed sufficient heat and have become sufficiently molten on the surfaces which are to be fused together, they are withdrawn simultaneously from the tool 3. This withdrawal movement over the heated lips 7 and 7a serves slightly to scrape the molten surfaces leaving the surfaces clean and free to amalgamate.

As previously mentioned, the socket 2 is applied to the tool 3 immediately before the spigot 1 so that the socket wall is in a slightly softer condition than the spigot when the socket and spigot are simultaneously withdrawn from the tool. The socket and spigot are next mated together, as shown in Figure 3, the spigot, due to its somewhat greater rigidity, tending to push the socket wall outwards as it penetrates, whilst the outer compression band 10 resists such outward pressure. As a result, the outer spigot wall and inner socket wall are held firmly under compression over the whole area of the molten surfaces. The behaviour of the thermoplastic material of which the spigot and socket are made is such that it accepts the heat on the surface but, being a bad conductor, allows the heat to penetrate only slowly through its molecular structure. In consequence, the area of the joint, tends, for a short period, to increase in softness which facilitates the compressive action of the outer band and retains complete density.

As the heat dissipates, the spigot and socket contract to their normal shape as shown in Figure 4, but here again the compression which the ring 10 exerts on the socket ensures that the area of the joint remains under compression until the joint is completed.

The provision of the frusto-conical portions 9, 9a within the tool collar and around the tool plug and the internal chamfering of the plug lip 7a is important in that surface parts of the spigot and socket which extend substantially perpendicular to the spigot and socket axes are thereby maintained out of contact with the tool body during the heating operation. As a result these surface parts do not melt during heating but remain comparatively rigid. There is thus no fear of burrs being thrown out when the end edge of the spigot meets an inwardly directed shoulder at the inner end of the socket in the mating position of the spigot and socket to cause obstructions within the bore.

The basic form of tool shown in Figures 1 and 2 may be modified in various ways and one such embodiment is illustrated in Figure 5. The main difference in this last-mentioned embodiment is that the plug part 5a of the tool is solid and a heat retaining ring 11 is applied to the outside wall of the collar part 4. This retaining ring 11 serves to conserve heat and also ensures a much more even dispersion of heat through the material. It is thus very suitable for use in cold northern countries and cold outdoor conditions. The ring 11 can be made of any material chosen to suit desired conditions and which differs from the material of which the tool is made.

In Figure 6 there is illustrated yet another embodiment of the tool shown in Figures 1 and 2, the difference in this case being that a heat retaining ring 11 is applied to the wall of the tool collar 4 and a circular electrically operable heating element 12 is applied externally to the ring 11. In this embodiment it should be noted that the tool plug part 5 is hollow but it will be appreciated that any of the plug parts in the illustrated tools could be solid or hollow as conditions demand.

All the tool forms illustrated are of one piece construction and they may have a handle applied thereto for facilitating manual manipulation. Similarly any of the tools may be provided with a stem which could be mounted in a vice or a self-supporting stand or any other similar supporting device. The tools may also be made with the collar and plug parts separate and adapted for screwed connection or they could be applied to a central circular flange for heat conservation. Also the tool parts could be mounted on a flat electrically heated platen, or in an appropriate box-like fitting containing or adapted to receive a suitable heat source.

In regard to the various operative surfaces of the tool it will be appreciated that the lips 7, 7a may be integral or alternatively may be made detachable either for the purpose of cleaning or to permit interchanging to accommodate slightly different sizes of plug and socket. In the same way the recessed radiant heat surfaces of the tool may be lined and made detachable either for purpose of cleaning or to permit the use of a material such as copper or Phosphor bronze which gives a greater reflection of heat due to its high conductive capacity and resistance to corrosive action.

I claim:
1. A method of jointing pipes, pipe fittings and the like members made of thermoplastic synthetic resin material and having one member end to be jointed formed as a socket and the other member end to be jointed formed as a hollow spigot, which comprises applying a resilient compressive force acting radially inwards to the peripheral socket wall, heating the socket wall from inside the socket to melt the inner peripheral socket wall surface and cause the socket wall to belly inwardly as a result of said compressive force acting thereon, heating the spigot wall from outside the spigot to melt the outer peripheral spigot wall surface and cause the spigot wall to belly outwardly due to natural expansion, and entering the spigot into the socket while the said peripheral surfaces are still in the melted condition and the compressive force maintained on the socket.

2. A method as claimed in claim 1 in which an inwardly directed shoulder provided at the inner end of said socket and an end edge provided on the spigot for abutting said shoulder are left in a solid condition while the inner peripheral socket surface and the outer peripheral spigot surface are melted to prevent the formation of internal burrs.

3. A method as claimed in claim 1 in which the spigot wall is heated slightly less than the socket wall so as to retain sufficient additional rigidity to push the socket wall outwards against the compressive force when the melted surfaces are mated together, the whole joint being thus maintained under compression until the spigot and socket have cooled and reverted to normal shape.

4. A method as claimed in claim 3 which further comprises the steps of sizing the surfaces to be mated during the initial application of heat and of lightly scraping the surfaces when molten.

References Cited in the file of this patent
UNITED STATES PATENTS

| | | |
|---|---|---|
| 1,240,287 | Woodward | Sept. 18, 1917 |
| 1,601,029 | Ligonnet | Sept. 28, 1926 |
| 2,142,149 | Replogle | Jan. 3, 1939 |
| 2,142,150 | Replogle | Jan. 3, 1939 |
| 2,269,593 | Maltby et al. | Jan. 13, 1942 |
| 2,384,014 | Cutter | Sept. 4, 1945 |
| 2,443,749 | Stunkel | June 22, 1948 |
| 2,498,831 | Veitch | Feb. 28, 1950 |
| 2,597,704 | Carlson | May 20, 1952 |
| 2,680,332 | Young | June 8, 1954 |
| 2,721,159 | Johnston | Oct. 18, 1955 |
| 2,739,829 | Pedlow et al. | Mar. 27, 1956 |
| 2,760,551 | Downey et al. | Aug. 28, 1956 |

FOREIGN PATENTS

| | | |
|---|---|---|
| 152,083 | Australia | June 29, 1950 |
| 278,090 | Switzerland | Jan. 3, 1952 |